United States Patent [19]

Balsells

[11] Patent Number: 5,203,849
[45] Date of Patent: Apr. 20, 1993

[54] CANTED COIL SPRING IN LENGTH FILLED WITH AN ELASTOMER

[76] Inventor: Peter J. Balsells, P.O. Box 15092, Santa Ana, Calif. 92705

[21] Appl. No.: 572,242

[22] Filed: Aug. 27, 1990

Related U.S. Application Data

[63] Continuation-in-part of Ser. No. 496,329, Mar. 20, 1990.

[51] Int. Cl.[5] .............................................. F16J 15/12
[52] U.S. Cl. .................................... 277/163; 277/164; 267/1.5; 267/166
[58] Field of Search ................. 277/163, 164, 235 R; 267/1.5, 166, 166.1, 167, 168

[56] References Cited

U.S. PATENT DOCUMENTS

| | | | |
|---|---|---|---|
| 2,957,717 | 10/1960 | Bram | 277/164 X |
| 3,183,010 | 5/1965 | Bram | 277/235 |
| 3,406,979 | 10/1968 | Weber | 277/164 |
| 3,445,120 | 5/1969 | Barr | 277/164 |
| 3,468,527 | 9/1969 | Mather | 277/235 |
| 3,653,670 | 4/1972 | Sifri et al. | 277/205 |
| 3,813,105 | 5/1974 | McQueen | 277/164 |
| 4,141,563 | 2/1979 | Wu | 277/164 |
| 4,379,558 | 4/1983 | Pippert | 277/164 |
| 4,509,763 | 4/1985 | Fischer | 277/163 |
| 4,655,462 | 4/1987 | Balsells | 277/164 |
| 4,809,989 | 3/1989 | Kernal | 267/1.5 |

*Primary Examiner*—William A. Cuchlinski, Jr.
*Assistant Examiner*—Daniel G. DePumpo

[57] ABSTRACT

A spring assembly includes a plurality of coils interconnected with one another in a spaced-apart relationship for causing the spring assembly to exert as force in a loading direction approximately normal to a tangent to a centerline of the plurality of coils in response to deflection of the spring assembly along the loading direction. An elastic material is provided which is disposed around and between the plurality of coils, but either not bonded to or partially bonded to the coils, modifying the force exerted by the spring assembly in response to the deflection of the spring assembly along the loading direction.

6 Claims, 6 Drawing Sheets

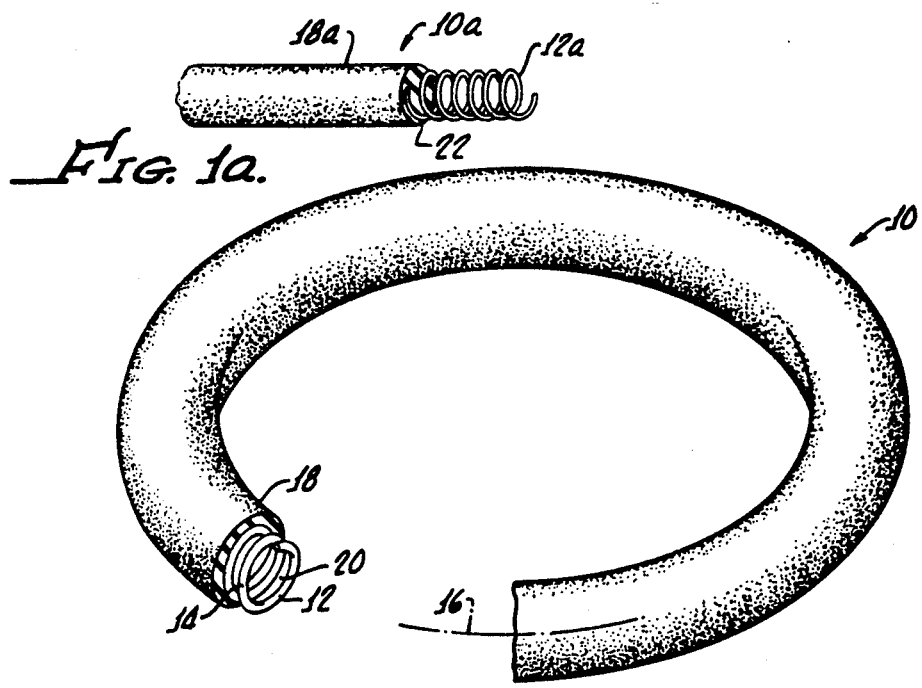
Fig. 1a.
Fig. 1b.
Fig. 1c.
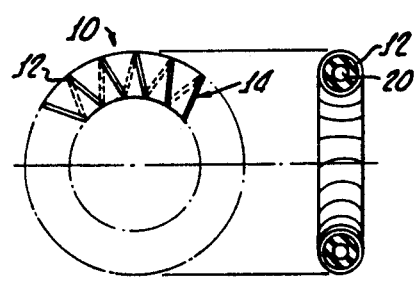
Fig. 1d.
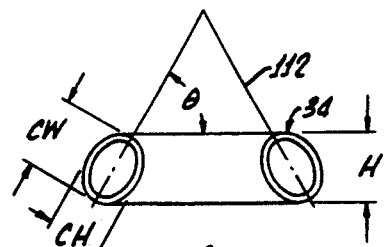
Fig. 7a.
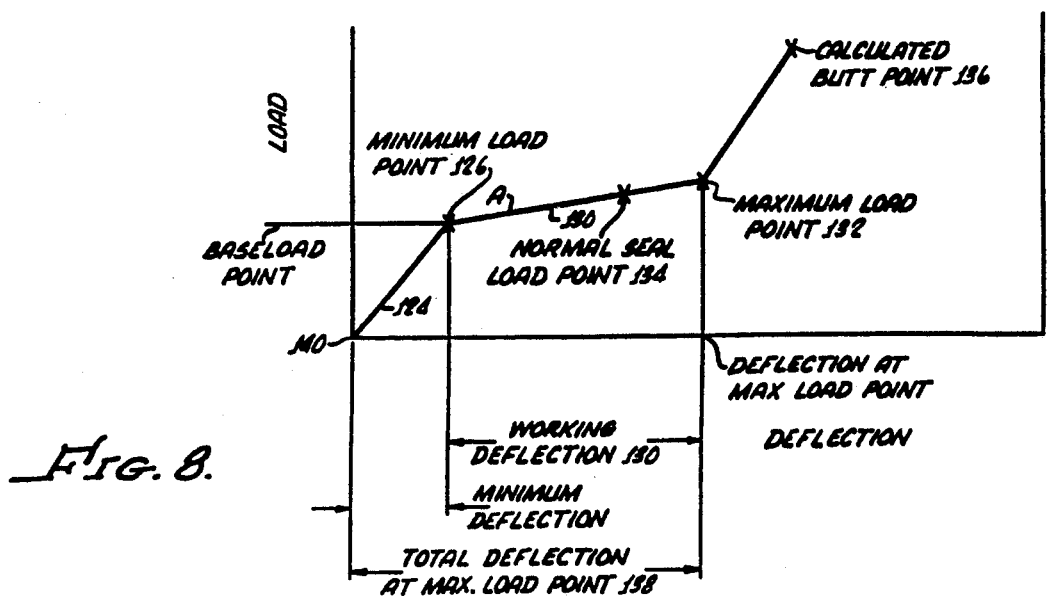
Fig. 8.

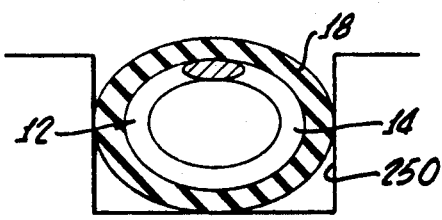
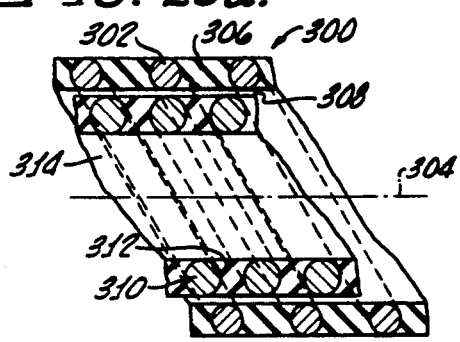
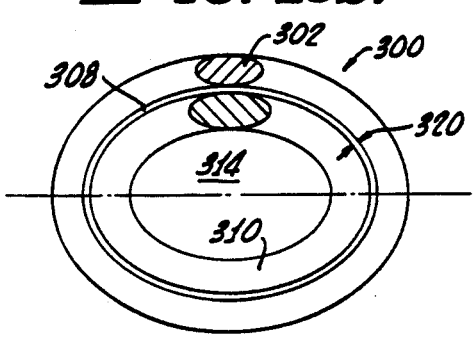
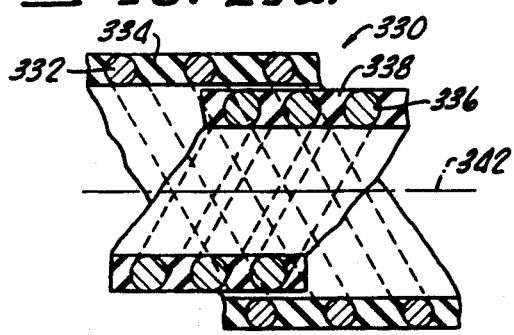
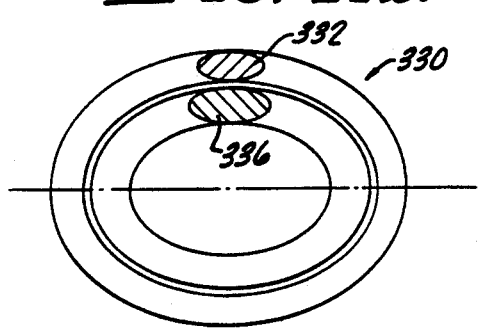
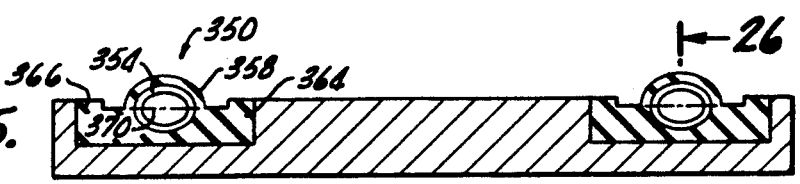
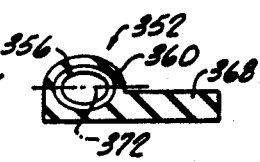
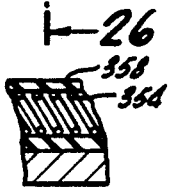

CANTED COIL SPRING IN LENGTH FILLED WITH AN ELASTOMER

This application is a continuation-in-part of U.S. Ser. No. 496,329, filed on Mar. 20, 1990.

The present invention generally relates to compression springs which exhibit predetermined resilient, or load-deflection, characteristics and particularly relates to canted-coil springs that are filled with an elastomer or plastic material having a hollow coil-cross section. It is well known that canted coil springs can be manufactured so that within a certain range of deflection thereof the force developed remains relatively constant. The advantages of these types of springs is pointed out in U.S. Pat. No. 4,655,462 to Balsells. Although the coil size, coil spacing, wire diameter, the angle the coils are canted with a centerline of the spring have been widely investigated in order to tailor the resilient characteristics of the spring to meet the needs of a proposed application, investigation continues in order to provide a wider range of spring resilient characteristics in order to expand the usefulness of the canted coil spring in industry.

Heretofore, there has been no attempt, however, to utilize an elastic or plastic in order to modify the force exerted by the spring assembly in response to deflection of the spring along a loading direction. Prior use of plastic material in combination with a canted coil spring has been limited to the use of a canted coil spring imbedded in an elastic material to provided a reinforcement therefor, totally sacrificing any load-deflection characteristics of the spring.

It is well known that when an O-ring is loaded, the force developed thereby is generally directly proportional to the deflection, thus in the case of U.S. Pat. No. 3,183,010 to Bram, when the canted coil spring is imbedded in the O-ring elastomer, it only provides, in combination therewith a higher force which is directly proportional to the deflection. Thus any advantage that a canted coil spring may otherwise provide is sacrificed in this combination.

The present invention is directed to a canted coil spring-elastomer combination which not only maintains the important force deflection characteristics of the canted coil spring, but may be used to enhance advantageous characteristics thereof, in addition to facilitating the tailoring of the combination to meet the demand of apparatus configurations not possible by a canted coil spring alone, an O-ring, or a combination thereof.

SUMMARY OF THE INVENTION

A spring assembly in accordance with the present invention generally includes a plurality of coils interconnected with one another in a spaced apart relationship and elastic means, disposed around and between the plurality of coils, but not adhering thereto, for modifying a force exerted by the coil means in response to a deflection thereof. Alternatively, in the elastic means may partially adhere to the plurality of coils.

The plurality of coils may be interconnected with one another in a spaced-apart relationship to provide means for causing the spring assembly to exert a force in a loading direction approximately normal to a tangent of the centerline thereof in response to deflection of the coil assembly along the loading direction. The elastic means may include an elastic, or flexible, material with a hollow cross section for modifying the force exerted by the spring assembly in response to the deflection of the spring along the loading direction. The spring assembly may be linear or have joined ends. The joined end spring may be circular and be suitable for radial or axial loading depending on the coil configuration and orientation. In one embodiment of the present invention; the plurality of coils are interconnected in a manner causing the spring assembly to exert a generally constant force in a loading direction approximately normal to a tangent of the centerline.

The elastic material may be generally tubular in shape and the plurality of coil means may be disposed within the generally tubular shaped elastic material and be bonded or non-bonded thereto. More particularly, the coil means may be disposed at an acute angle to a centerline thereof and disposed within the elastic material in a stretched spaced-apart relationship in which case the elastic material has sufficient resistance to hold the plurality of coils in the stretched spaced-apart relationship. The spacing between the coil means in the stretched spaced-apart relationship may be greater than the spacing between the coil means when not held in the spaced-apart relationship by the elastic material.

Alternatively, the spring may be disposed within the elastic material in a preloaded condition in which the plurality of coils are deflected along the loading direction with or without bonding of the elastic material to the coils. This is to be distinguished from the hereinabove recited embodiment in which the coils are in a stretched configuration but not deflected along the loading direction while disposed within the elastic material. By stretching the hollowed elastomeric filled spring, a combination of radial and compression load can be developed that provides substantially improved sealing ability, especially when loading radially on a shaft, or the like.

In another embodiment of the present invention the coil means may have an oval perimeter and the elastic material may include means for defining a circular hollow center portion thereof. Alternatively, the elastic material may include means for defining a plurality of hollow area within the elastic material and inside the plurality of coil means.

In yet another embodiment of the present invention, the coil means may have an oval perimeter and the elastic means may include means for defining a generally rectilinear hollow center portion thereof.

The elastic means may include means, defining a shape thereof, for positioning the plurality of coils in order that the loading direction is approximately perpendicular to the centerline tangent. The elastic means shape may include dependent portions substantially larger than the diameter of the plurality of coil means for effecting the positioning thereof.

The present invention, the spring assembly may include a first plurality of coil means as hereinabove described, and a second plurality of coil means, interconnected with one another in a spaced-apart relationship and disposed within the first plurality of coil means in a cooperating relationship therewith for causing the spring assembly to exert a generally constant force in a loading direction approximately normal to a centerline of said first and second plurality of coil means in response to deflection of the spring assembly along the loading direction.

The first and second coil means may be canted in the same direction along a common centerline thereof or canted in opposite directions along the common centerline. Further, at least one of said first and second plurality of coil means may be disposed in the elastic material and in a stretched-apart relationship as hereinbefore described or, alternatively, at least one of the first and second plurality of coil means may be disposed in the elastic material in a preloaded condition as hereinabove described.

A method is provided by the present invention for the manufacture of an assembly which includes the steps of fabricating a wire to produce coils interconnected with one another in a spaced-apart relationship and thereafter disposing an elastic material in and around the coils with the elastic not bonded or partially bonded to the coils. The elastic may be bonded to the coils in which case the elastomer does not fill the interior portion of the coils along the centerline thereof. One embodiment of the present invention, a step is included in the method of manufacture in which the ends of the wire and the elastic material are joined to form a continuous spring assembly. In addition, a step may be provided in which the coils are deflected while the elastic material is disposed in and around the coils. Further, a step may be provided which includes stretching the coils apart from one another while disposing the elastic material in and around the coils.

BRIEF DESCRIPTION OF THE DRAWINGS

A better understanding of the present invention may be had from the consideration of the following detailed description, taken in conjunction with the accompanying drawings, in which:

FIGS. 1a and 1b are partially cut-away perspective views of a spring assembly in accordance with the present invention generally showing a plurality of coil means disposed within as elastic material;

FIG. 1c is a cross-sectional view of the spring assembly shown in FIG. 1b with a material therein which is later removed in accordance with the method of the present invention;

FIG. 1d is a round spring embodiment of the present invention filled with an elastomer with a hollow core;

FIG. 7a shows in schematic form, a cross-section of a canted coil spring having a turn angle;

FIG. 8 shows a typical load-deflection curve for a spring assembly in accordance with the present invention for the purpose of defining the nomenclature thereof;

FIG. 22 is a cross section view of a spring in accordance with the present invention disposed in a groove;

FIGS. 23a and b are views of an alternative embodiment of the present invention showing a first plurality of coils with an elastic material thereabout and a second plurality of coils coaxially disposed therein with an elastic material thereabout;

FIGS. 24a and b shows an alternative embodiment of the present invention in which the first and second plurality of coil means being canted in opposite directions, and the elastic material has a substantially greater dimension than the diameter of the plurality of coils which provides a means for positioning the plurality of coils in order that the loading direction is approximately perpendicular to the centerline tangent;

FIG. 25 is a sectional view of an alternative embodiment of the present invention showing the mounting of the spring assembly utilizing portions of an elastic member to position the coils;

FIG. 26 is a cross section view of FIG. 25 taken along the line 26—26; and

FIG. 27 is an alternative embodiment of the present invention showing an alternate shape of the elastic member.

DETAILED DESCRIPTION

Figure 3:
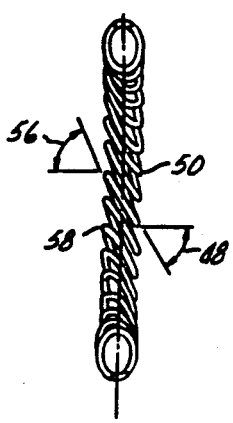
FIG. 3 is a view taken along the line 3—3 of the spring shown in FIG. 2 illustrating a back angle on an inside diameter of the spring and front angle on an outside diameter of the spring.
Figure 2:
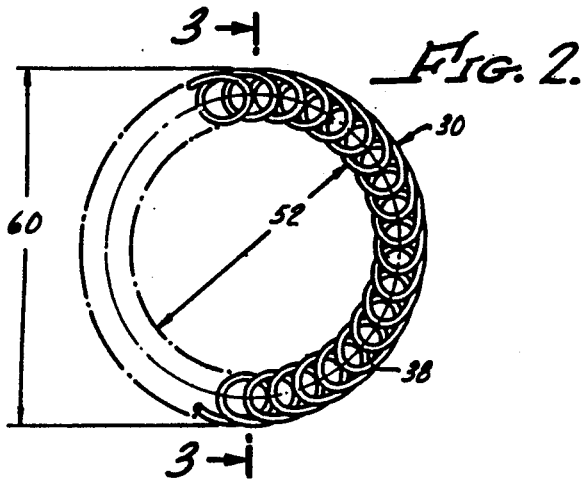
FIG. 2 is an axial canted coil spring in accordance with the present invention with the coils being canted in a clockwise direction.

Turning now to FIGS. 1a, 1b and 1c, there is generally shown a spring assembly 10a, 10b, in accordance with the present invention, which includes a plurality of coils 12a, 12b interconnected with one another in a spaced-apart relationship. The spring 14 may be assembled in order to exert a generally constant force in a loading direction, normal to a tangent to a centerline 16, as will be hereinafter described in greater detail.

An elastic material 18a, 18b which is disposed around and between the plurality of coils 12 may include a hollow cross-section 20 which provides means for modifying the force exerted by the spring assembly 14 in response to deflection of the spring assembly 10 along a loading direction as hereinafter described in greater detail. As shown in FIG. 1d, the spring assembly 14 may include circular coils, not canted to a centerline thereof, or as hereinafter described, canted coil assemblies.

The spring 10a is linear and may have ends attached to form the spring assembly 10b which may be circular or shown or have any other shape which may be useful in forming a gasket type seal around a rectangular opening, for example. The elastic material 18a, 18b, may be of any suitable type plastic or the like, with resiliency suitable for the overall design objectives of the spring assembly 1a, 1b.

Before application of the elastomer 18a, 18b, to the coils 12a, 12b, a coating 22 may be applied to the coils 12a, 12b, in order to control the bonding of the elastomer 18a, 18b thereto. With proper selection of the coating, which may be any conventional silicon release material or the like, depending on the elastomer, complete non-bonding of the elastomer or partial bonding of the elastomer 18a, 18b, to the coils 12a, 12b may be achieved. However, any method for controlling the bonding of an elastomer to a metal, as may be well known in the art, may be utilized. For example, many elastomers, such as Silastic 732 RTV adhesive sealant from Dow Corning of Midland, Mich. requiring a metal surface to be primed with a suitable material to obtain adherence thereto. Consequently, if the coils 12 are not primed, or partially primed, some bonding or partial bonding will occur.

FIGS. 2 through 7 show a number of canted coil assemblies 30, 32, 34, 36 suitable for use in the present invention, each including a plurality of coils 38, 40, 42, 44. The springs 30 and 32 have the coils 38, 40 interconnected in a manner forming a circular spring having a primary load-deflection characteristic along an axial direction of the circular spring 30, 32. Spring 30 shown in FIGS. 2 and 3 has a clockwise canting coil, with the coils 38 interconnected so that a back angle 48, which defines a trailing portion 50, is along an inside diameter 52 of the spring 30 and a front angle 56, which defines a leading portion 58 of the coil 30, is along an outside diameter 60 of the spring 30.

Figure 5:
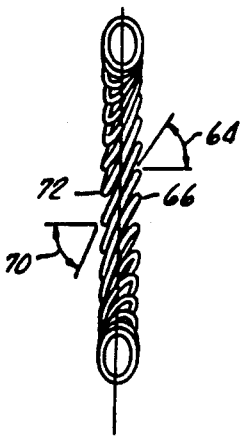
FIG. 5 is a view showing the spring in FIG. 4 taken along the line 5—5 illustrating a back angle on an outside diameter of the spring and a front angle on an inside diameter of the spring.
Figure 4:
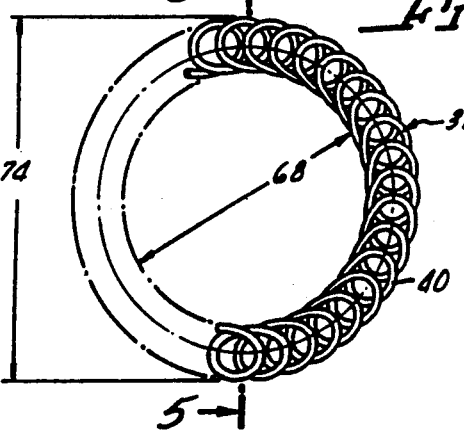
FIG. 4 is a spring in accordance with the present invention in which the coils are canted in a counter clockwise manner.

Turning to FIGS. 4 and 5, the axial spring 32 therein has coils 40 interconnected in a manner having counterclockwise canted coils with a back angle 64 defining a trailing portion 66 along an inside diameter 68 of the spring 32 and a front angle 70, defining a leading portion 72 along an outside diameter 74 of the spring 32.

Figure 6:
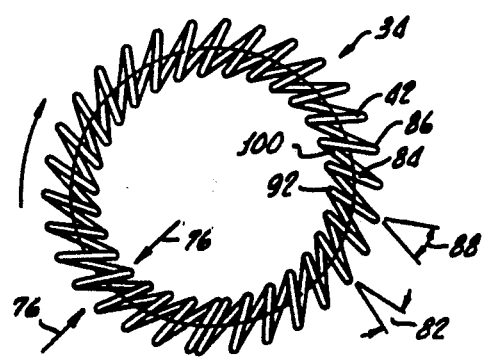
FIG. 6 is a plane view of a radial spring in accordance with the present invention which is canted in a clockwise direction along the centerline thereof, with the back angle on the top.
Figure 7:
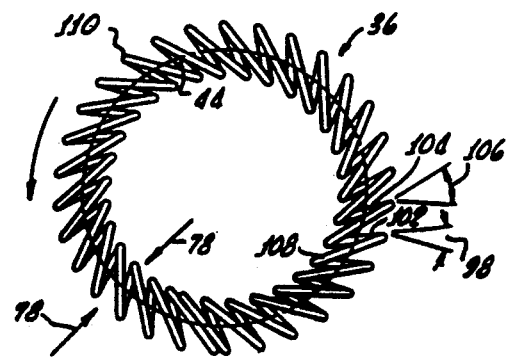
FIG. 7 is a canted coil radial spring in accordance with the present invention in which the coils are canted in a counter-clockwise direction of the back angle disposed in the bottom thereof.

Turning now to FIGS. 6 and 7, there are shown springs 34, 36 having a plurality of coils 42, 44 which are interconnected in a manner forming a circular spring having a primary load-deflection characteristic along a radial direction indicated by the arrows 76, 78, respectively. As shown in FIG. 6, the coils are interconnected in a manner for providing a clockwise canting with a back angle 82 defining a trailing portion 84 along a top 86 and a front angle 88 defining a leading portion 92 disposed along the bottom 100 of the spring 34.

Alternatively, as shown in FIG. 7, spring 36 may have coils 44 connected in a manner causing a canting of the coils in a counter-clockwise direction with a back angle 98 defining a trailing portion 100 along a bottom 102 of the spring 36 and a front angle 106 defining a leading portion 108 along a top 110 of the spring 36.

As hereinafter described, all of the springs 30, 32, 34, 36, may have a generally constant force deflection characteristic within a working deflection thereof.

Yet another structural arrangement of the canted coil assemblies 30, 32, 34 and 36 is their orientation within the elastomer 18. As described in U.S. Pat. No. 4,893,795 issued Jan. 16, 1990, to Balsells, entitled, "Radially Loaded Canted-Coil Springs With Turn Angle," the spring assembly may be held in a turn angle orientation by the elastomer.

FIG. 7a shows in schematic form, a cross-section of the canted coil spring 34, in accordance with the present invention, with a turn angle of $\theta$, a measured coil width of C.W, a measured coil height of CH and a measured spring height H of the spring 34. As shown in FIGS. 7a, the turn angle may be clockwise (bold lines) or counterclockwise. (Dashed lines). The turn angle $\theta$ may be defined as an angle formed by a generally circular spring forming a cone or inverted cone, depending on the position of the spring, and measuring the turn angle for the horizontal to the intersection through the centerline 112 of the spring 34.

FIG. 8 shows a representative load-deflection curve A for springs 30, 32, 34, 36 in which the spring exhibits a generally linear load-deflection relationship as shown by the line segment 124, until it reaches a minimum load point 126, after which the load-deflection curve remains relatively constant within a working deflection 130 between the minimum load point 126 and a maximum load point 132. Between the minimum load point 126 and the maximum load point 132, the load-deflection curve may be constant, or show a slight increase as shown in FIG. 8.

The area between the minimum load point 126 and the maximum load point 132 is commonly referred to as the working range 130 of the spring. The spring 30, 32, 34, 36 is normally loaded for operation within this range as indicated by the point 134.

Loading of the spring 30, 32, 34, 36 beyond the maximum load point 132, results in an abrupt deflection response until it reaches a butt point 136, which results in a permanent set of the spring as a result of overloading. Also indicated in FIG. 8 is a total deflection range of 138 representing the deflection between a zero point 140 and the maximum load point 132.

As hereinabove noted, the elastomer, or elastic material, 18a, 18b, (See FIGS. 1a and 1b) suitable for the present invention, may be any synthetic or natural material capable of recovering its original size and shape after deformation. That is, the material is resilient.

Figure 9:
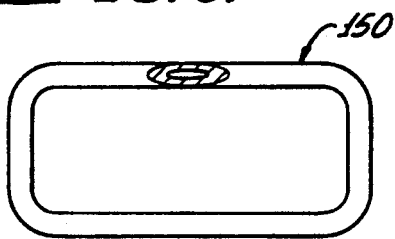
FIG. 9 shows an axial spring with an irregular shape in accordance with the present invention having a hollow interior.

While the spring assembly 10 shown in FIG. 1 has a generally circular shape, it should be appreciated that any irregular shape such as the spring assembly 150 shown in FIG. 9 as long as the cross-section thereof is hollow in cross-section. Alternatively, the spring 12 may not be joined, for example, as shown in FIG. 1. In this instance, the length of elastomer coated, or filled, coils may be used in applications suitable for linear springs.

The spring 14 may be filled by any manufacturing method suitable for the elastomer employed, such methods including extrusion, molding, spraying or any other suitable method for introducing elastomer 18 in and around the coils 12 of the spring 14, while leaving a hollow cross section 20 along the centerline 16. Such other methods may include the fusing of two tubular parts (not shown), one disposed on the inside of the spring 14 and one disposed on the outside of the spring 14 with the fusing of the parts filling of the spaces between the coils 12.

Alternatively, the elastomer 18 may be formed in and around the coils 12 while a rod 151 of compound 150 is disposed within the coils 12. (See FIG. 1C). Thereafter the compound is dissipated or removed by heat or solution, as is well known in the art.

Figure 10:
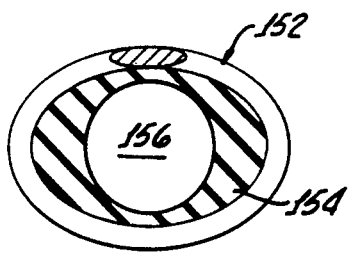
Figure 11:
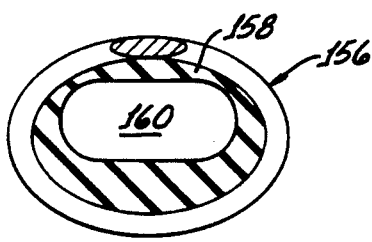
Figure 12:
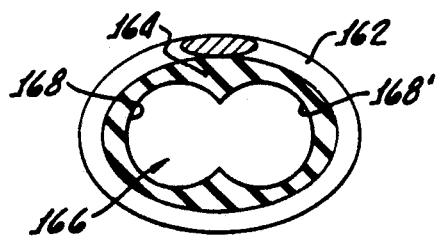

Various embodiments of the present invention are shown in FIGS. 10 through 15. In FIG. 10, coils 152 with an interior elastomer 154 are shown with the coils 152 having an elliptical shape and the elastomer 154 having a circular shaped void 156 therethrough. FIG. 11 shows elliptically shaped coils 156 having an elastomer 158 with an offset, or generally rectangular, hollowed cross-sectional opening 160 therethrough, while FIG. 12 shows an elliptically shaped coils 162 having an elastomer 164 with an irregularly shaped opening 166 comprising to generally circular cross-sectional areas 168, 168'.

Figure 13:
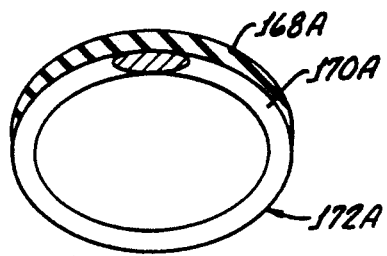
FIGS. 10-13 show various inner cross-sectional configurations in accordance with the present invention.

As hereinabove mentioned, the elastic material may be disposed within the coils 152, 156, 162 as shown in FIGS. 10, 11 and 12 or, alternatively, as shown in FIG. 13, an elastomer 168A may be disposed on one side 170A of coils 172A. This embodiment is most useful in applications in which a greater distribution of the load is desirable on the one side 170A of the coils 172A.

Figure 14:
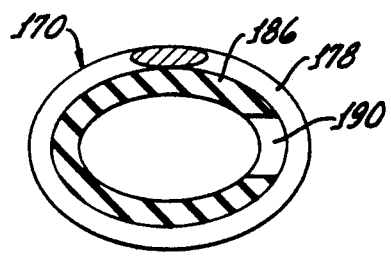
FIGS. 14-16 show variations in encapsulation of the coils of the present invention with an elastomer.
Figure 15:
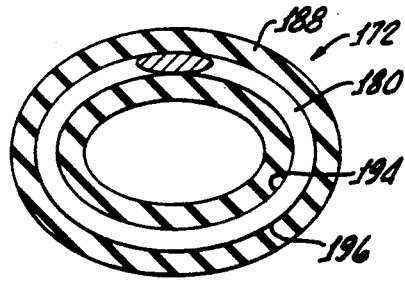
Figure 16:
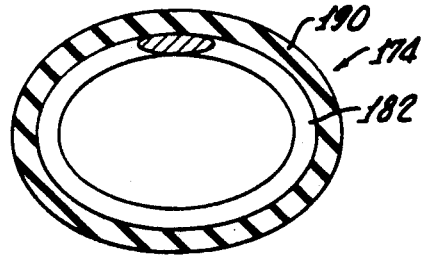

Other embodiments 170, 172, 174, of the present invention, shown respectively in FIGS. 14 through 16, said embodiments 171, 172, 174 including coils 178, 180, 182 and elastomers 186, 188, 190. The embodiment 170 includes an open area 190 through the coils 178 in order to facilitate the passage of fluid (not shown) for pressure variation, cooling or lubrication purposes.

As can be seen from FIG. 15, the elastomer 188 may be disposed as a coating on both the inside 194 and outside 196 of the coil 180, while FIG. 16 shows the elastomer 190 disposed along the outside and through the coils 182. All of these embodiments differently affect the force-deflection characteristics of the embodiments 171, 172, 174 depending upon the application of the embodiment 171, 172, 174.

The ability to maintain a relatively constant force within a certain deflection is affected by a number of parameters, all of which are taken into consideration, which include the cross-section of the elastomer and the disposition thereon as indicated in FIGS. 10 through 16; the thickness of the elastomer, the flexibility of the elastomer, the degree of bonding between the springs 152, 154, 170, 186, 188, 190 and corresponding elastomers 154, 156, 168, 186, 188, 190, the spacing between the coils 152, 154, 170, 178, 180, 182, the wire diameter, coil height and coil width, among other considerations.

It is to be appreciated that when a canted-coil spring is filled with an elastomer, especially in an outer portion of the coil, the force applied thereon is transmitted more uniformly and the stress acting on the mating parts is substantially lower. In applications where the canted-coil spring assembly 10 is used in connection with the sealing device, it provides substantially better sealing ability and results in a substantial increase in the seal performance and seal life.

The ability of the hollowed canted-coil spring filled with an elastomer having a hollow center to achieve a high degree of deflection and maintain a relatively constant load within a high deflection decreases the total amount of force that is needed to affect sealing and this offers a significant advantage, especially in dynamic situations. The ability of the hollowed elastomer filled spring to stretch facilitates its assembly in a single groove construction, similar to that as can be found in O-ring applications for both mounting the assembly 10 in a piston (not shown) or in a housing (not shown).

Another very important feature of the elastomer-filled spring 14 with hollow cross section 20 is its use as a seal itself. Heretofore, elastomers have used the canted-coil spring as a loading means in order to maintain intimate contact between the sealing surfaces of the elastomer. In many prior art applications, the elastomer tends to age or relax due to aging stiffness of the elastomer, or due to temperature cycling, and the spring is used to force the elastomer in contact with the sealing surfaces. In the present invention, by combining the elastomer 18 within the spring 14 and providing a hollow cross section 20, both items can be accomplished in one, with a higher degree of reliability and sealing ability, and this can be done in reciprocating, rotating, oscillating, and static applications.

Another important feature is to use the spring assembly 10 as a loading means to provide more uniform loading on a sealing surface (not shown) which results in substantially better performance because it enables the use of a smaller wire thus uniformly distributing the load which results in more effective sealing ability and longer seal life.

In all these applications, the elastomer 18 may be any type of elastomeric material such as silicone, Buna N, nitrile, fluorosilicones, PTFE, elastomers, etc. Also, certain types of plastics that have the properties of elastomers can be used due to their high coefficient of friction, their operating temperature, etc.

Figure 17:
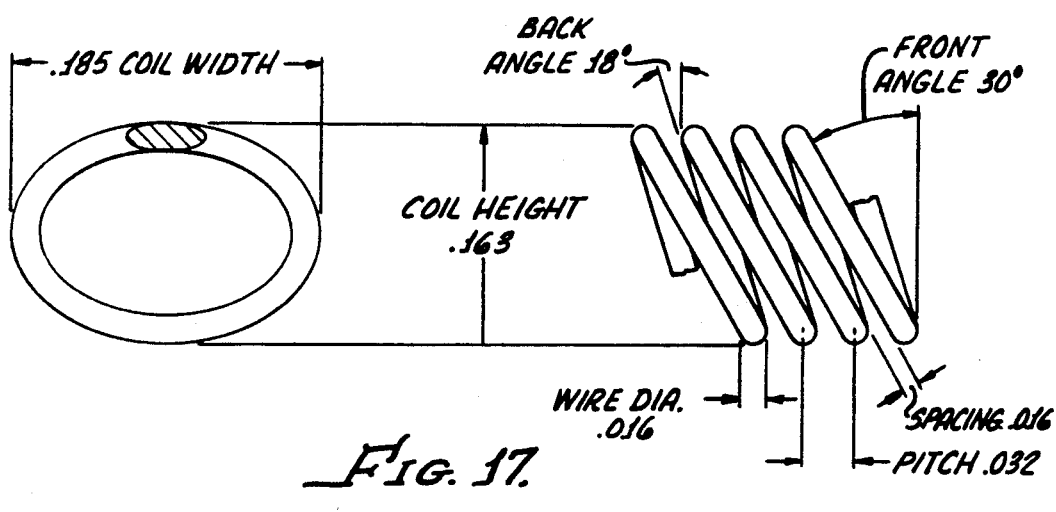
FIG. 17 is a spring, in accordance with the present invention, with a plurality of coils showing specific dimensions thereof.
Figure 18:
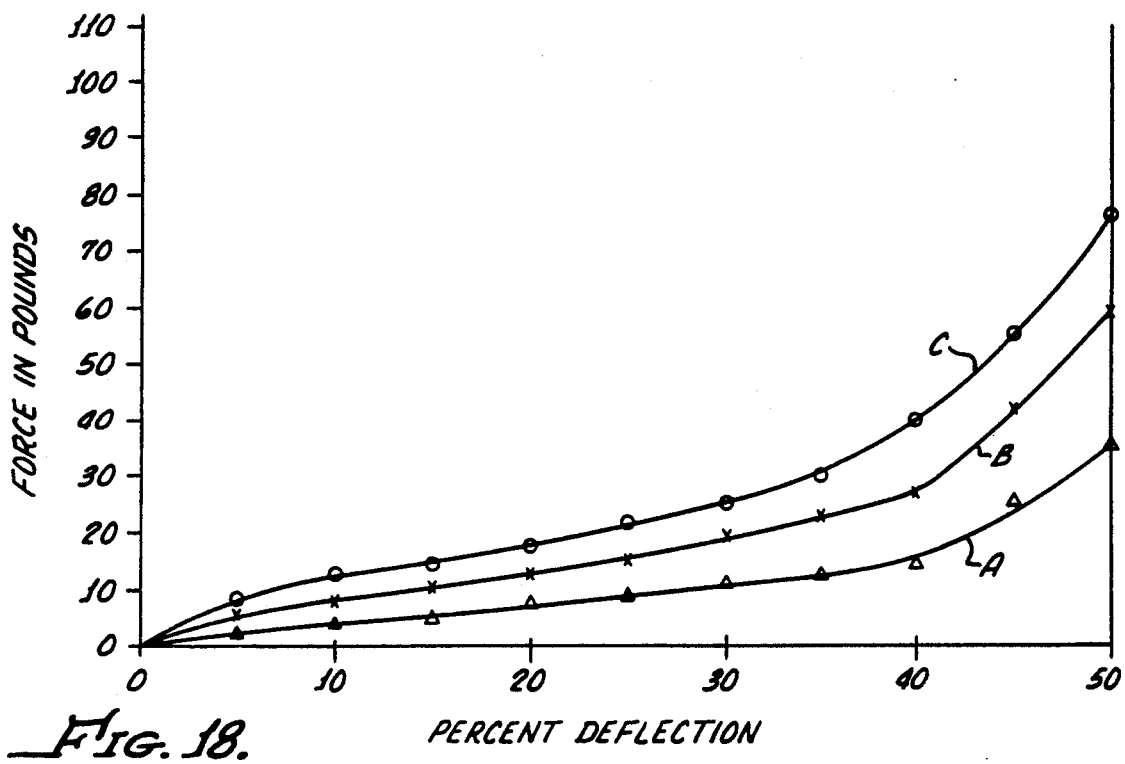
FIG. 18 is a series of curves showing the effect of hollowed elastic material on the force-deflection curve of a canted coil spring.

A specific example of the force-deflection characteristics for the spring 14, with coils 12 is set forth in FIG. 17, is shown in FIG. 18 as curve A. When the elastomer, such as Dow Corning Silastic 732 RTV was filled between the coils 12 and interior thereof to a thickness of 0.016 inches with a cross-section as shown in FIG. 10, the resulting force-deflection curve obtained is illustrated as curve B in FIG. 18. The same elastomer was disposed between the coils 12 and within the coils 12 to a thickness of 0.026 inches with a cross-section shown in FIG. 12. The resulting force-deflection curve is shown as curve C in FIG. 18.

As shown by the curves A, B and C of FIG. 18, the force-deflection curve of the spring assemblies 152, 160, which remains relatively constant but greater than the spring 12 without elastomer shown in curve A. As the amount of elastomer is increased or as a cross-section is varied by adding elastomer on the outside diameter or on the inside diameter of the coil, the force developed increases.

Figures 19A, 19B, 19C:
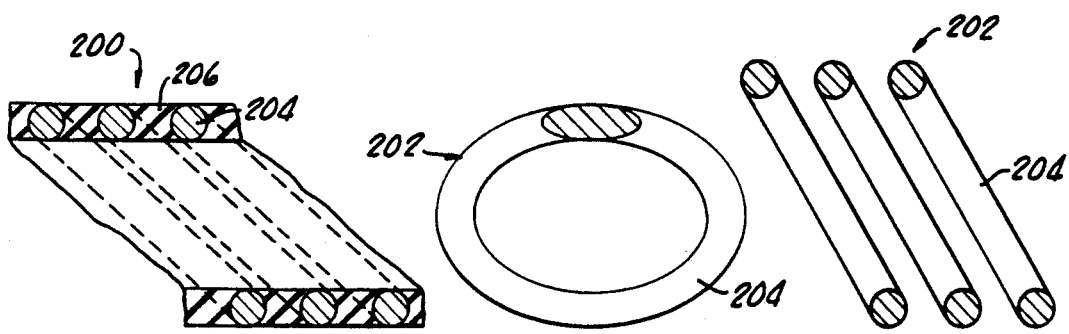
FIGS. 19A-C shows in cross-sectional manner a spring disposed within an elastomer in a preloaded condition.
Figure 20:
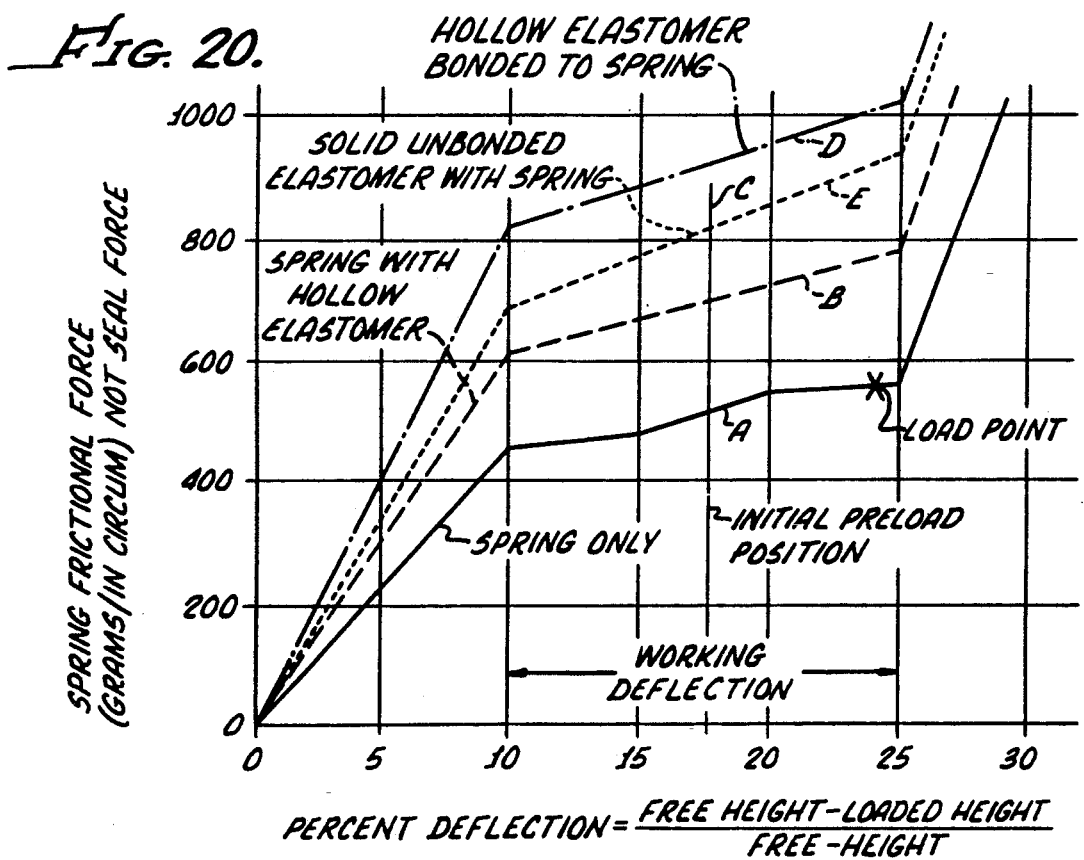
FIG. 20 shows the effect on the force-deflection curve of a spring held in a preloaded condition by the elastomer.

Turning now to FIG. 19a, there is shown as spring assembly 200 in accordance with the present invention in which the spring 202, shown also in FIGS. 19b and c, includes a plurality of coils 204 which are preloaded before being imbedded in an elastomer 206. This further enables the tailoring of the force-deflection curve of the spring assembly 200. Curve A in FIG. 20 shows the force-deflection curve for the spring 202 only while Curve B shows the load-deflection curve for the preloaded spring and an elastomer, the elastomer being Silastic 732 RTV adhesive sealant available for Dow Corning of Midland, Mich. It should be appreciated that while the deflection of the spring is limited, a higher load is produced and, furthermore, with a 17.5 percent deflection in preloading shown as point C in FIG. 20. In this example, the coils 8, 40, 42, 44 are not bonded to the elastomer.

Also shown in FIG. 20 as Curves D and E are springs 30, 32, 34 36 having a solid elastomer cross-section with the elastomer not bonded to the coils 38, 40, 42, 44 (Curve E) and a hollow elastomer with the elastomer bonded to the coils 38, 40, 42, 44 (Curve D).

It should be appreciated that the higher the adherence between the coils 38, 40, 42, 44 and the elastomer, the greater the force developed and the lower the flexibility of the spring assembly.

Reviewing Curves A–E of FIG. 20, it can be seen that the spring (Curve A) only has the lowest force and the spring with the hollow elastomer, which is primed and bonded, providing the highest load (Curve D). The spring having a solid elastomer provides a force curve slope increasing at a steeper angle. Such slope will vary depending on the hardness and flexibility of the elastomeric material. In the case of a very flexible material, the curve may have less slope but in the case of a bonded elastomeric material with a high durometer reading, the curve will be nearly proportional to deflection.

Figures 21A, 21B, 21C:
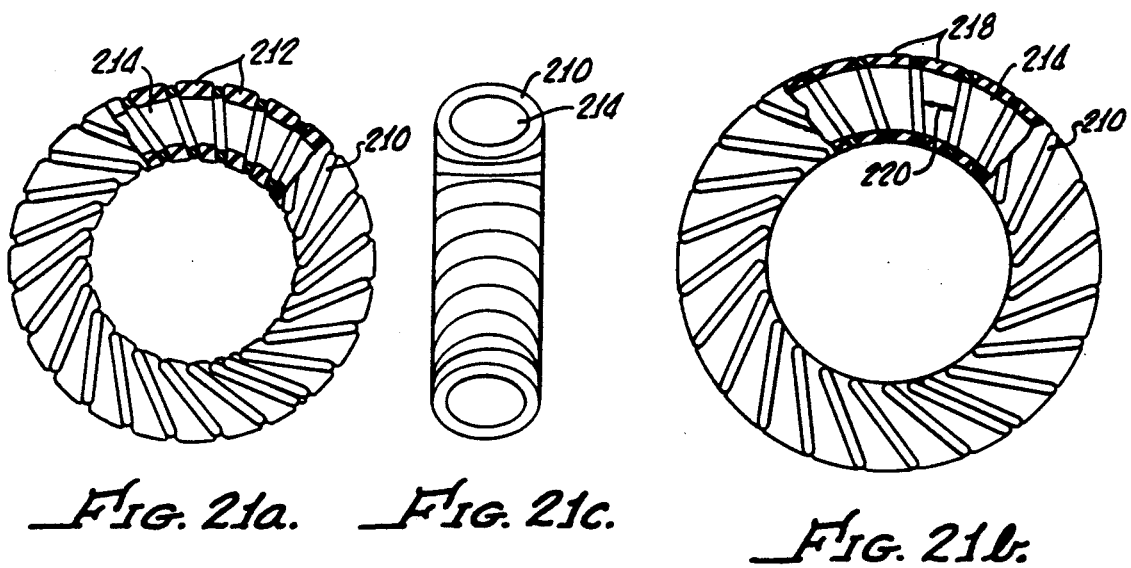
FIGS. 21A-C shows a spring in a free position and imbedded in an elastomer in a stretched configuration.

FIG. 21a shows a radial spring 210 filled with an elastomer material 212 having a hollow center 214.

In this case, the spring is in a free position when filled with material. It should be contrasted with the FIG. 21b in which the spring 210 is stretched, with greater spaces as indicated by the arrow 220 between the coils 210 when filled with the elastomer material 218, the latter having a hollow core 214 as shown in FIG. 21C. The force developed by the spring 210 depends on the amount of stretch with the mechanical of the elastomer, degree of bonding, spacing between the coils, ratio of the coil height to coil width, etc. A spring of this type may be used in order to provide an extension load or can be used to provide a combination of extension load and compression load. In either case, stretching of the coils can be used to further modify the force-deflection curve of the spring 210.

In the manufacture of the spring assembly 10, the spring 14 may be made longer than necessary to complete a circle within a groove 250 as shown in FIG. 22, the groove 250 being in a piston or housing, not shown. In this instance, the excessive spring length will cause the elastomer 18 to butt and therefore eliminate any gap between the spring ends.

Turning to FIG. 23a and b, there is an alternate embodiment of the spring assembly 300 which includes a first plurality of coils 302 interconnected with another in a spaced-apart relationship for causing the spring assembly 300 to exert a generally constant force in a loading direction normal to a tangent to a centerline 304. As hereinbefore described in connection with the plurality of coils 12, an elastic material 306 is disposed around and between the plurality of coils 302 a hollow cross section 308 which provides means for modifying the force exerted by the spring 302 assembly 300 in response to deflection of the spring assembly 300 along a loading direction as hereinbefore described.

Disposed within the plurality of coils 302 is a second plurality of coils 310 interconnected with one another in a spaced apart relationship and disposed in a cooperating relationship inside the first plurality of coils for causing the spring assembly 300 to exert a generally constant force in a loading direction approximately normal to the centerline 304.

An elastic material 312 disposed around and between the plurality of coils 310 and includes a hollow cross section 314. FIG. 23b shows a cross sectional view of the spring assembly 300 and also showing that the elastic materials 306, 312 may be separate from one another with a gap 320 therebetween to allow relative movement therebetween as the spring assembly 300 is loaded.

Similar to the spring assembly 300, a spring assembly 330 shown in FIGS. 24a and b include a first plurality of coils 332 with an elastic material 334 disposed therearound and a second plurality of coils 336 within the elastic material 338 therearound. The configuration of the first and second plurality of coils 332, 336 and elastic material 334, 338 is similar to the coil assembly 300 shown in FIG. 23a and b except that the first plurality of coils 332 is canted in an opposite direction from the second plurality of coils 336 along a centerline 342. The performance of the embodiments shown in FIGS. 23a and b and 24a and b are similar to that hereinbefore described in connection with the spring assembly 10 further extending the design range capability of the forced deflection curves thereof.

Turning now to FIGS. 25–27, there is shown alternative embodiments 350, 352 of the present invention which include a plurality of coils 354, 356 within the elastic material 358, 360 thereabout. The feature of the embodiments of 250, 352 is the shape of the elastic 358, 360 which includes depending portions 364, 366 and 368, respectively, which provide a means for positioning the plurality of coils 354, 356 in order that the loading direction is approximately perpendicular to the centerline 370, 372, respectively. Although not shown in FIG. 26, the elastomer 358 may be disposed between the coils 354 as hereinabove shown in FIGS. 19a, 23a and 24a.

Although there has been described hereinabove a specific arrangement of a spring assembly in accordance with the present invention, for the purposes of illustrating the manner in which the invention may be used to advantage, it should be appreciated that the invention is not limited thereto. Accordingly, any and all modifications, variations, or equivalent arrangements which may occur to those skilled in the art, should be considered to be within the scope of the invention as defined in the appended claims.

What is claimed is:

1. A spring assembly comprising:
    a first plurality of coil means, interconnected with one another in a spaced-apart relationship, for causing the spring assembly to exert a generally constant force in a loading direction approximately normal to a tangent to a centerline of said plurality of coil means in response to deflection of the spring assembly along said loading direction;
    a second plurality of coil means, interconnected with one another in a spaced-apart relationship and disposed within said first plurality of coil means, and in a cooperating relationship therewith, for causing the spring assembly to exert a generally constant force in a loading direction approximately normal to a tangent to a centerline of said second plurality of coil means in response to deflection of the spring assembly along said loading direction; and
    elastic material means, disposed around and between said first and second plurality of coil means, and partially adhering to the coil means for modifying the force exerted by the spring assembly in response to deflection of the spring assembly along said loading direction, said elastic material means comprising an outer portion disposed around the first plurality of coil means and an inner portion disposed around said second plurality of coil means, said outer and inner portions being separate and unattached to one another.

2. A spring assembly comprising:
    a first plurality of coil means, interconnected with one another in a spaced-apart relationship, for causing the spring assembly to exert a generally constant force in a loading direction approximately normal to a tangent to a centerline of said plurality of coil means in response to deflection of the spring assembly along said loading direction;

a second plurality of coil means, interconnected with one another in a spaced-apart relationship and disposed within said first plurality of coil means, and in a cooperating relationship therewith, for causing the spring assembly to exert a generally constant force in a loading direction approximately normal to a tangent to a centerline of said second plurality of coil means in response to deflection of the spring assembly along side loading direction; and elastic material means, disposed around and between said first and second plurality of coil means, but not adhering to the coil means for modifying the force exerted by the spring assembly in response to deflection of the spring assembly along said loading direction, said elastic material means comprising an outer portion disposed around the first plurality of coil means and an inner portion disposed around said second plurality of coil means, said outer and inner portions being separate and unattached to one another.

3. The spring assembly according to claim 2 wherein said first and second coil means are canted in the same direction with respect to a common centerline thereof.

4. The spring assembly according to claim 2 wherein said first and second coil means are canted in opposite directions with respect to a common centerline thereof.

5. The spring assembly according to claim 2 wherein at least one of said first and second plurality of coil means is disposed within said elastic material in a stretched spaced-apart relationship, the elastic material having sufficient resistance to hold the stretched apart plurality of coil means in said stretched spaced-apart relationship, the spacing between coil means in said stretched spaced-apart relationship being greater than the spacing between coil means when not held in a stretched-apart relationship by the elastic material.

6. The spring assembly according to claim 2 wherein at least one of said first and second plurality of coil means is disposed within said elastic material in a preloaded condition in which the plurality of coils are deflected along the loading direction.

* * * * *